(12) United States Patent
Oeda

(10) Patent No.: US 7,162,503 B2
(45) Date of Patent: Jan. 9, 2007

(54) COMPUTER SYSTEM WITH PLURALITY OF DATABASE MANAGEMENT SYSTEMS

(75) Inventor: Takahashi Oeda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 42 days.

(21) Appl. No.: 10/808,774

(22) Filed: Mar. 24, 2004

(65) Prior Publication Data

US 2004/0243647 A1   Dec. 2, 2004

Related U.S. Application Data

(62) Division of application No. 09/823,640, filed on Mar. 30, 2001, now Pat. No. 6,754,679.

(30) Foreign Application Priority Data

Apr. 11, 2000  (JP)  ............................ 2000-115782

(51) Int. Cl.
*G06F 17/30* (2006.01)
(52) U.S. Cl. .......................... 707/203; 707/10
(58) Field of Classification Search .................... None
See application file for complete search history.

(56) References Cited

U.S. PATENT DOCUMENTS

| | | | |
|---|---|---|---|
| 4,464,223 A | 8/1984 | Gorin | |
| 4,585,516 A | 4/1986 | Corn et al. | |
| 5,006,978 A | 4/1991 | Neches | |
| 5,457,793 A | 10/1995 | Elko et al. | |
| 5,479,656 A | 12/1995 | Rawlings, III | |
| 5,630,067 A | 5/1997 | Kindell et al. | |
| 5,649,168 A | 7/1997 | Huang et al. | |
| 5,724,600 A * | 3/1998 | Ogi ............................. | 712/11 |
| 5,831,985 A | 11/1998 | Sandorfi et al. | |
| 5,852,715 A * | 12/1998 | Raz et al. ................... | 709/201 |
| 5,884,028 A | 3/1999 | Kindell et al. | |
| 6,122,630 A | 9/2000 | Strickler et al. | |
| 6,167,405 A | 12/2000 | Rosensteel et al. | |
| 6,317,807 B1 * | 11/2001 | Dorricott et al. ........... | 711/102 |
| 6,438,141 B1 * | 8/2002 | Hanko et al. ................ | 370/477 |
| 6,509,828 B1 | 1/2003 | Bolavage et al. | |
| 6,704,489 B1 * | 3/2004 | Kurauchi et al. ............. | 386/46 |
| 6,754,679 B1 * | 6/2004 | Oheda ......................... | 707/201 |
| 6,898,609 B1 * | 5/2005 | Kerwin ........................ | 707/203 |
| 2002/0029224 A1 * | 3/2002 | Carlsson ................... | 707/104.1 |

FOREIGN PATENT DOCUMENTS

| | | |
|---|---|---|
| EP | 0869438 A | 10/1998 |
| WO | WO97/35269 A | 9/1997 |
| WO | WO98/35291 A | 8/1998 |
| WO | WO99/54805 A | 10/1999 |

OTHER PUBLICATIONS

"SAN Basics: A Technical White Paper from MetaStor Storage Solutions," LSI Logic Corporation Milpitas, CA (Sep. 1999).

(Continued)

*Primary Examiner*—Jean M. Corrielus
(74) *Attorney, Agent, or Firm*—Townsend and Townsend and Crew LLP

(57) ABSTRACT

According to the invention, a database combining module, such as a software on a server, is used together with a resource manager software of a disk storage system in which a database is stored. A resource allocation for the disk storage system is determined to satisfy specifications requested by a user provided to a database combining module. Host paths and volumes are allocated and snapshots are controlled based on the processing of these software modules.

8 Claims, 7 Drawing Sheets

OTHER PUBLICATIONS

"Tegal says TEL enjoined from selling etchers with dual-frequency technology," Semiconductor Business News, http://seminews.com/sbn/sbnh2/news/19990901a1.shtml (Sep. 1999).

Singer "The Challenge: Automating the Industry," Technical Program Proceedings Semicon / West 1984 San Mateo, California pp. 272-275 (May 1984).

Zajac et al. "Automated Plasma Etch Systems for VLSI," Technical Program Proceedings Semicon / West 1984 San Mateo, California pp. 27-35. (May 1984).

Zajac et al. "Multi-Electrode Plasma Etching," Tegal Process Review, pp. 1-3, Tegal Corp. Petaluma, CA (May 1984).

* cited by examiner

COMPUTER SYSTEM WITH PLURALITY OF DATABASE MANAGEMENT SYSTEMS

CROSS-REFERENCES TO RELATED APPLICATIONS

The present application is a Divisional application of Ser. No. 09/823,640, filed Mar. 30, 2001, now U.S. Pat. No. 6,754,679 which is related to and claims priority from Japanese Patent Application Reference No. P00-115782, filed Apr. 11, 2000, each of which is incorporated by reference herein in its entirety for all purposes.

BACKGROUND OF THE INVENTION

The present invention relates to a computer system with databases. More specifically, the present invention relates to the replication of databases in a computer system in which different types of database management systems (DBMS) are present.

In the past, corporate information systems comprised mainly of on-line transaction processing systems (OLTP systems) that primarily used mainframes. These are known as enterprise systems or management systems. However, in recent years OLTP systems by themselves could not provide efficient support for strategic decision making, and this has led to the introduction of data warehousing. In data warehousing, history information is extracted and accumulated over time from OLTP systems to allow efficient analysis of client trends and market trends. This type of system is also referred to as an integrated information system.

While conventional OLTP systems have been built primarily around mainframes, data warehouses and data marts are often built with open systems. Thus, platforms and performance requirements may vary, and the DBMS used in the OLTP system is often different from the DBMSs used in the data warehouses and data marts. Thus, in today's corporate information systems, different DBMSs are used together, and data must be extracted and updated between these databases.

However, analyzing client trends and markets brings the need for the most recent data that will allow the most appropriate services and products to be provided and will allow the most effective investment decisions. Furthermore, a composite analysis of different types of information is likely to allow more effective analysis. However, there is generally a trade-off between the amount of data to be extracted and the frequency at which data is to be extracted, and there is a limit to how much both can be increased. Without appropriate control over performance, optimal analysis cannot be provided.

What is really needed are techniques for combining databases, especially databases having heterogeneous formats, in a disk storage system.

SUMMARY OF THE INVENTION

According to the invention, techniques for combining databases, especially databases having heterogeneous formats, by creating an intermediate copy of data in a disk storage system are provided. Such techniques can be embodied in methods, computer software and the like, that can be disposed on a server, for example, within a computer system. The present invention can provide embodiments that perform data replication by creating an intermediate file in a disk storage system. Embodiments according to the present invention can allow resources of the disk storage system to be managed in a way that meets the requested specifications of the user, and can allow replication to be implemented in a manner that satisfies user specifications such as requested refresh rates.

In a representative embodiment, a refresh manager manages refresh of data to a database, and can receive a requested refresh rate from a user. Further, a performance manager can control information transfer capacity of the disk storage system based on the provided replication information volume and the requested refresh rate. Furthermore, the disk storage system includes a plurality of host interfaces, a plurality of volumes, and modules for allocating volumes that can be accessed from the host interfaces. The disk storage system also includes a module that controls the sharing of volumes among heterogeneous interfaces and controls transfer capacity based on instructions from a module for combining databases, e.g., allocation of volumes and allocation of host paths.

In another representative embodiment according to the present invention, a method for replicating a database is provided. The method is operable in a computer system comprising a disk subsystem, having a plurality of storage volumes, in which the disk subsystem is connected to a plurality of computers by one or more information channels including a network. The method can comprises a variety of steps, such as receiving at a first computer one or more requested specifications relating to replication. A step of determining a data transfer capacity according to the specifications can also be part of the method. The method can also include determining one or more data transfer capacity settings according to the data transfer capacity and notifying the disk subsystem of the data transfer capacity settings. Further, the method can include allocating resources in the disk subsystem for data transfer based on the data transfer capacity settings; and then copying content from a first database to a second database using the resources in the disk subsystem. The copying is performed using the resources in the disk subsystem substantially independently of sending the content over the network.

In a further representative embodiment according to the present invention, in a computer system including a first server and a second server, interconnected by a network to a disk storage subsystem, a method for replicating content of a first database associated with the first server to a second database associated with the second server is provided. The first database and the second database can be disposed in the disk storage subsystem, for example. The method comprises a plurality of steps, including allocating resources to perform a copy within the disk storage subsystem. A step of replicating content from the first database to the second database is also included in the method. The replicating is performed using the resources in the disk subsystem substantially independently of sending the content over the network.

In a specific embodiment, the computer system can also comprise a third server. The method can further include steps such as a step of receiving at the third server one or more requested specifications relating to replication. The method can also include determining a data transfer capacity according to the specifications and determining one or more data transfer capacity settings according to the data transfer capacity. The disk subsystem can be notified of the data transfer capacity settings, and resources can be allocated in the disk subsystem for data transfer based on the data transfer capacity settings.

In a yet further embodiment according to the present invention, a disk storage subsystem is provided. The disk storage subsystem is operable in a computer system comprising a plurality of computers, which can be interconnected to the disk storage subsystem by one or more of information channels, including a network, for example. The disk storage subsystem can copy content from a first database to a second database using resources in the disk subsystem substantially independently of sending the content over the network. The copy is performed by the disk storage subsystem in accordance with a resource allocation received from one of the plurality of computers.

The resource allocation based upon one or more of data transfer capacity settings determined by the one of the plurality of computers in accordance with a data transfer capacity and one or more of received specifications.

In a still further embodiment, a computer program product for replicating a database is provided. The computer program product is operable in a computer system comprising a disk subsystem, having a plurality of storage volumes, the disk subsystem connected to a plurality of computers by one or more of information channels, including a network, for example. The computer program product comprises a computer readable storage medium containing a variety of code. For example, the computer program product includes code for receiving at a first computer one or more requested specifications relating to replication. Further, the computer program product can include code for determining a data transfer capacity according to the specifications and code for determining one or more of data transfer capacity settings according to the data transfer capacity. Code for notifying the disk subsystem of the data transfer capacity settings can also be included in the computer program product. The disk subsystem allocates resources for data transfer based on the data transfer capacity settings provided by said code for notifying. Further, the disk subsystem, responsive to the code for notifying, will perform a copy of content from a first database to a second database using the resources in the disk subsystem. This copy is performed using the resources in the disk subsystem substantially independently of sending the content over the network.

Numerous benefits are achieved by way of the present invention over conventional techniques. In a system performing replication by creating an intermediate file in a disk storage system, the present invention allows resources of the disk storage system to be managed in a way that meets the requested specifications of the user, and allows replication to be implemented in a manner that satisfies user specifications such as requested refresh rates. These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

Figure 1:
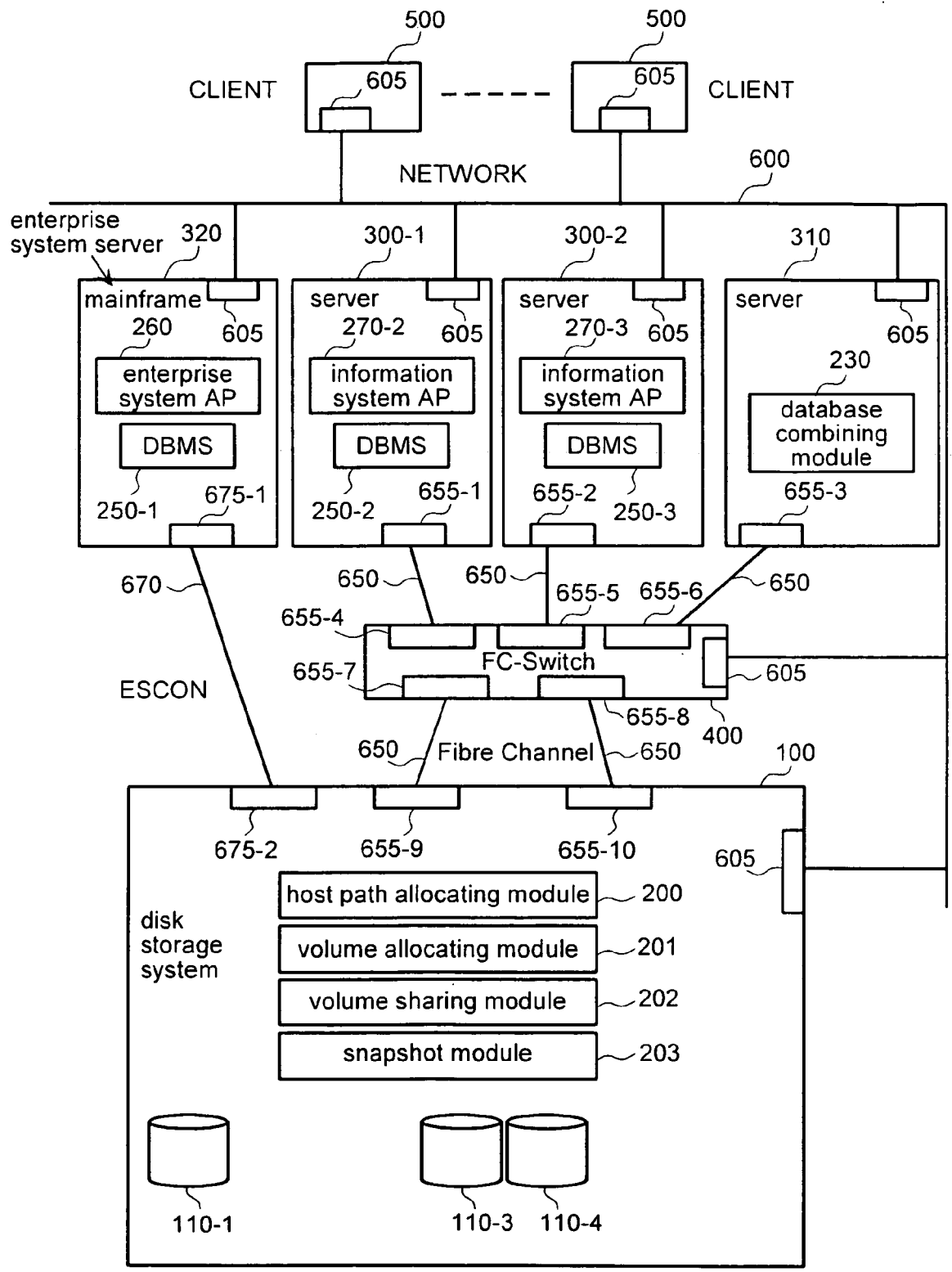
FIG. 1 illustrates a drawing showing a representative architecture of a system suitable for embodying a particular embodiment of the present invention.

The present invention can provide embodiments that perform data replication by creating an intermediate file in a disk storage system. Embodiments according to the present invention can allow resources of the disk storage system to be managed in a way that meets the requested specifications of the user, and can allow replication to be implemented in a manner that satisfies user specifications such as requested refresh rates.

Enterprise systems store history data relating to past database updates over time (this data is generally stored to magnetic disk devices or magnetic tape devices). The data extracted from enterprise systems is accumulated in a data warehouse database. In many cases, the data from the data warehouse database is further extracted and accumulated in the form of data marts, where data relating to a particular purpose is extracted and collected as a database, based on what is being analyzed. In this type of enterprise system, the copy of a database is known as a replica and the creation of a replica is known as replication. A replica can be a copy of an enterprise system database at a particular point in time that spans all items, or it can be a copy of selected items. In either case, the data in the replica is identical to the data in the enterprise system database at a particular point in time. For example, from the perspective of an application that monitors sales status or financial status, replication is a distributed database feature.

While OLTP systems have been built primarily around mainframes, data warehouses and data marts are often built with open systems. Thus, platforms and performance requirements may vary, and the DBMS used in the OLTP system is often different from the DBMSs used in the data warehouses and data marts. Thus, in today's corporate information systems, different DBMSs are used together, and data must be extracted and updated between these databases.

In a system with different DBMSs, an application software (AP) used to perform a certain analysis or the like can access data that straddles different types of DBMSs. Rather than directly accessing the different DBMSs, the AP in this patent goes through software, referred to as an interface module, to access data without the AP needing to consider the specific specifications of the DBMSs or where they are located. This reduces the burden involved in creating the AP. For further information about extracting data from a plurality of databases, reference may be had to a U.S. Pat. No. 5,649,168, entitled "Computer program product for a query pass through in a heterogeneous distributed database environment," the entire contents of which are incorporated herein by reference for all purposes.

A disk volume equipped with both an interface for mainframes, e.g., ESCON, and an interface for open computers, e.g., fibre channel, stores intermediate data, and databases such as data warehouse databases and data marts are created from this intermediate data. Accordingly, the information system AP accesses a data warehouse database or a data mart. The technology for a disk storage system supporting volumes that can be shared between mainframes and open systems is further described in A Japanese laid-open patent publication number 9-258908, the entire contents of which are incorporated herein by reference for all purposes.

If an interface module is used, the AP accesses and extracts data from the heterogeneous DBMS each time through a network. In analyses that require a large amount of data, the cost of obtaining the data is high and processing is slow. Also, the load on the DBMS in which the data is stored, the load on the network through which the data is transferred, and the load on the computer CPUs used to process the network protocols used for the transferring the data are all increased.

In the technique using intermediate data, there is no performance management for data extraction, and there is no management of how recent the history information to be analyzed is to be. In other words, there is no control over how frequently the information system database is to be updated.

FIG. 1 is a schematic drawing of the architecture of a particular embodiment of the present invention. An enterprise server (hereinafter referred to as mainframe) 320 includes a network interface 605 and a mainframe channel interface 675. An enterprise application 260 and a DBMS 250-1 run on the operating system of the mainframe 320. This enterprise application 260 and the DBMS 250-1 typically form an OLTP system, e.g., in the case of a bank system it would handle enterprise system operations for recording deposits and withdrawals for accounts. The transaction data is stored on a volume 110-1 of a disk storage system 100. The volume 110-1 is set up as a mainframe volume and is accessed through the mainframe channel interface 675 of the disk storage system 100.

Servers 300-1, 300-2 include a network interface 605 and a fibre channel interface 655 respectively. Information system applications 270-2, 270-3 and DBMS 250-2, 250-3 run on the operating systems of the servers 300-1, 300-2. The DBMS 250-2 and the DBMS 250-3 are generally different types DBMS. In this case, the information system application 270-2 uses the data from the DBMS 250-2 and the information system application 270-3 uses the data from the DBMS 250-3. The data from the DBMS 250-2 is stored in a volume 110-3 via a fibre channel interface 655-1, a fibre channel switch 400, and a fibre channel interface 655-9 of the disk storage system 100. The data from the DBMS 250-3 is stored in a volume 110-4 via a fibre channel interface 655-2, the fibre channel switch 400, and the fibre channel interface 655-9 of the disk storage system 100.

The data in the volume 110-3, which is the data from the DBMS 250-2, is a data warehouse database containing data reflecting transaction data for the DBMS 250-1 of the mainframe 320 extracted over time. This data extraction/reflection process (replication process) will now be described in further detail with references to FIG. 5.

Figure 5:
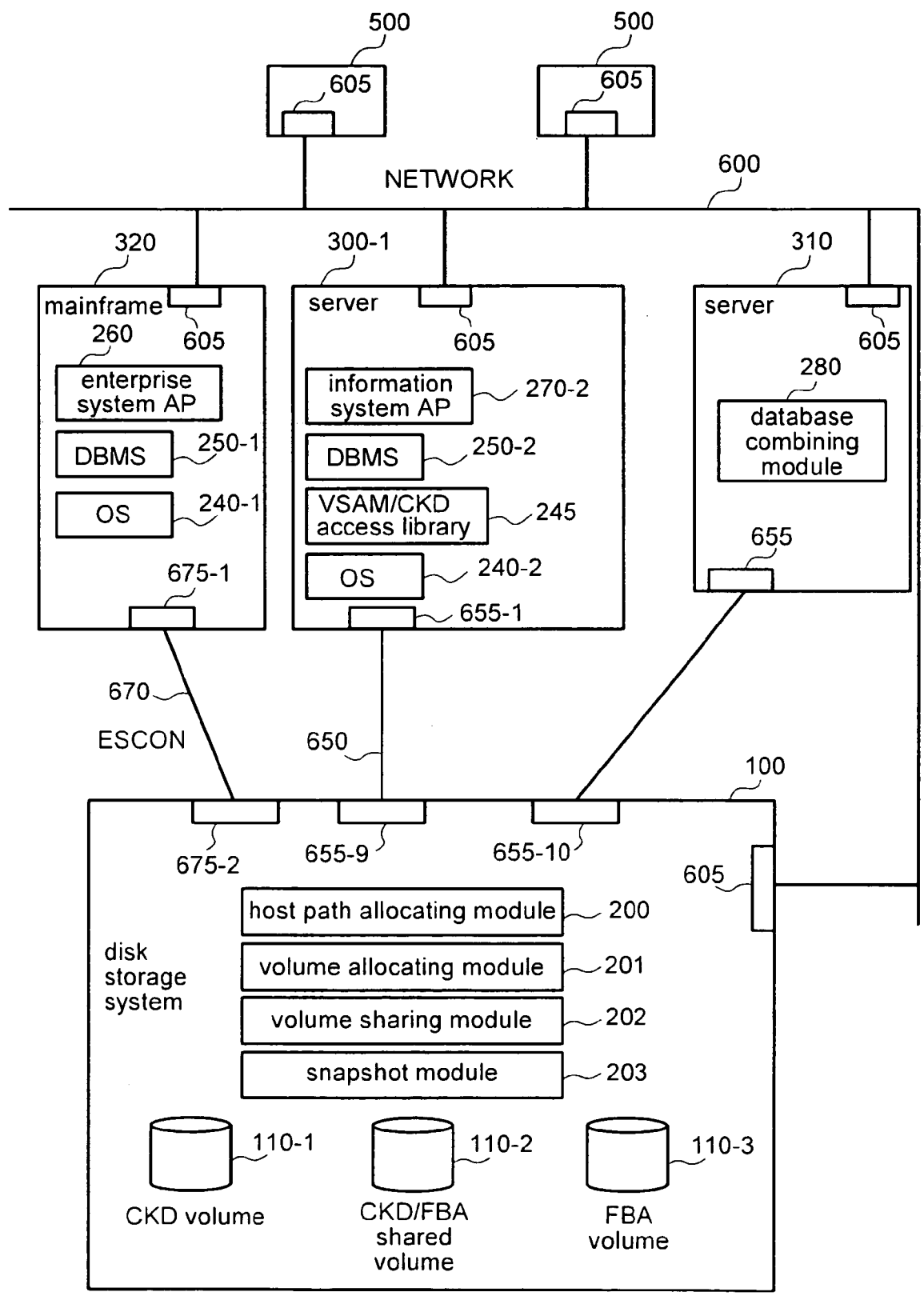
FIG. 5 illustrates a drawing showing a representative architecture for replication operations according to a particular embodiment of the present invention.

FIG. 5 illustrates the volume 110-1 of the disk storage system 100 in a representative embodiment. Volume 110-1 is a volume used by the mainframe 320 and uses a CKD (Count Key Data) format, which is a disk accessing method for mainframes. Unlike the FBA (Fixed Block Access) method used with SCSI (Small Computer System Interface), the CKD format uses variable-length blocks.

The data for the information system application 270-2 of the open-system server 300-1 is stored in the volume 110-3 of the disk storage system 100, which uses an FBA data format. In the replication process described here, the data extracted from the CKD volume 110-1 is reflected in the FBA volume 110-3.

A server 310 handles this replication operation. Database combining module 280 of the server 310 first sets up a CKD/FBA shared volume 110-2 for storing intermediate data in the disk storage system 100. To do this, database combining module 280 works through a network 600 to set up an unused volume in the disk storage system 100 as a CKD/FBA volume and to instruct the disk storage system 100 to allocate the volume so that it can be accessed through both the mainframe channel interface 675-2 and the fibre channel interface 655-9. Volume sharing module 202 of the disk storage system 100 sets up the specified volume as a CKD/FBA shared volume and allocates host paths so that the volume can be accessed through both the mainframe channel interface 675-2 and the fibre channel interface 655-9. The CKD/FBA shared volume is an intermediate file used for replication. This intermediate file is provided in the disk storage system to allow differences in DBMS specifications to be absorbed here as well as to speed up the disk storage system.

Then, database combining module 280 notifies the enterprise system AP 260 or the DBMS 250-1 of the address of the CKD/FBA shared volume 110-2. This address is used and the data extracted from the CKD volume 110-1 is written by the mainframe 320 as a VSAM file to the CKD/FBA shared volume 110-2 via the mainframe channel interfaces 675-1, 675-2. The server 300-1 uses the fibre channel interfaces 655-1, 655-9 to read this intermediate data. When reading this data, a VSAM/CKD access library 245 on the server 300-1 converts the VSAM file stored in the CKD format on the volume 110-2 to a format that can be understood by the DBMS 250-2 (e.g., a CSV file stored with a FBA format) and passes the results to the DBMS 250-2. The DBMS 250-2 reflects this data in a table in the FBA volume 110-3. During this operation, the CKD/FBA shared volume 110-2 uses a buffer memory for data transfers. Control of this operation is performed with information such as the address of the CKD/FBA shared volume 110-2 into which data has been written or the address from which data has been read being passed between the main frame 320 and the server 300-1 and the server 310 via the network 600.

By performing replication between different types of DBMSs in this manner, the DBMS data can be extracted/reflected without being transferred over a network. Also, the dynamic setup and allocation of CKD/FBA shared volumes required for replication does not need to be handled by enterprise system applications or the information system applications.

Figure 2:
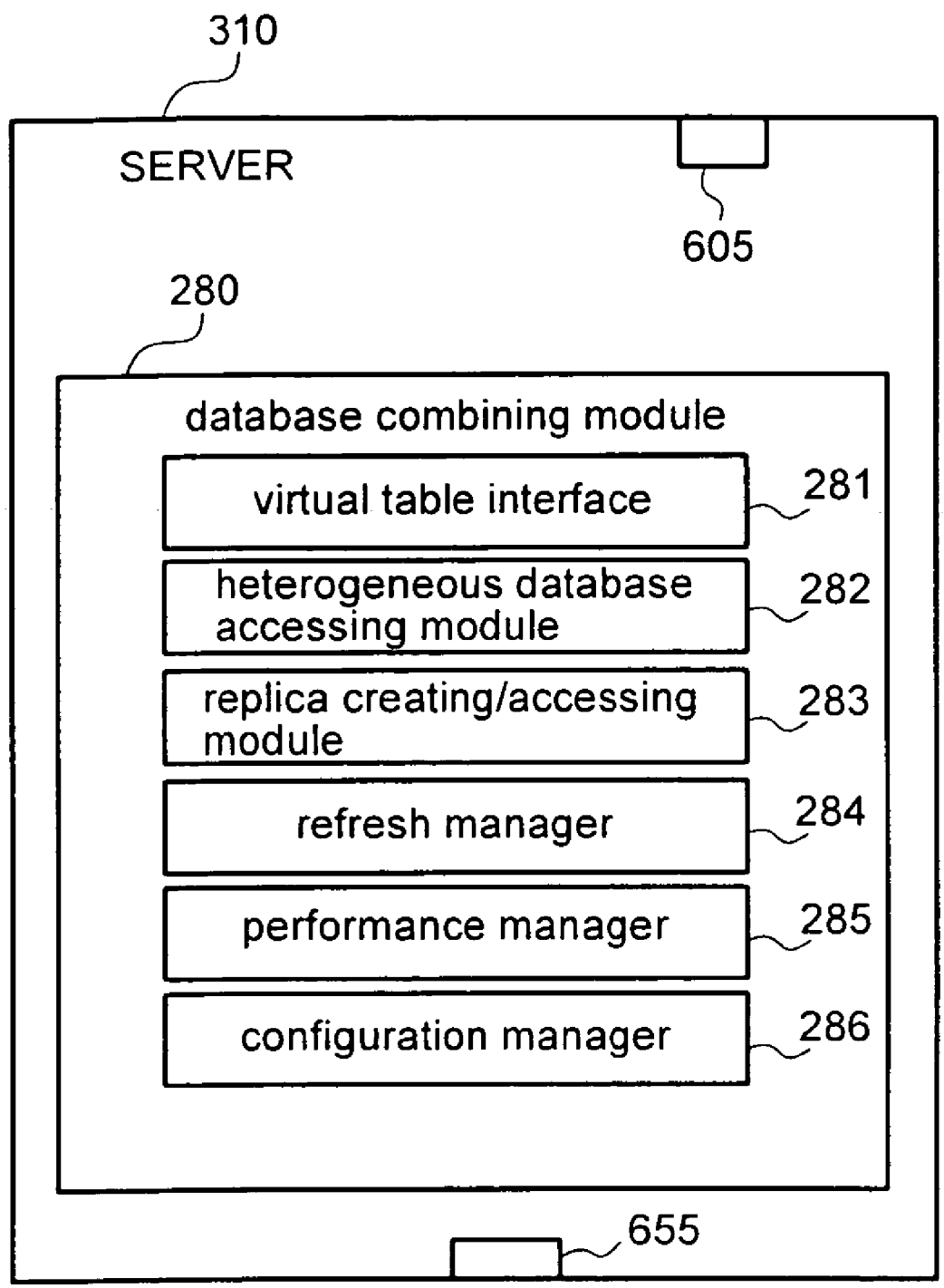
FIG. 2 illustrates a drawing of representative database combining module 280 of a server 310 in a particular embodiment of the present invention.

Referring to FIG. 2, the following is a description of database combining module 280 of the server 310 mentioned in the description of FIG. 5. Database combining module 280 includes a virtual table interface 281, heterogeneous database accessing module 282, replica creating/accessing module 282, refresh manager 284, performance manager 285, and configuration manager 286.

The virtual table interface 281 is an interface that provides data needed by other information system applications. Heterogeneous database accessing module 282 actually extracts needed data from heterogeneous DBMSs distributed in the system. A query (e.g., an SQL statement) received from an information system application is converted into a format appropriate for the corresponding database and data is extracted via the network. One technique for performing this extraction is described in U.S. Pat. No. 5,649,168, for example. The virtual table interface 281 provides information systems applications with data extracted from heterogeneous databases in the form of a single table.

The following is a restated detailed description of the elements of database combining module described with reference to FIG. 2. The virtual table interface 281 defines a table (virtual table) in which tables from a different type of database or a plurality of database tables are combined as part of a virtual interface. When an application issues a query to this virtual table, the virtual table interface 281 passes on the query to heterogeneous database accessing module 282.

Heterogeneous database accessing module 282 takes the query received from the virtual table interface 281 and converts it into a query for the original tables in the different database or the plurality of databases, which is then issued to the corresponding database. Heterogeneous database accessing module 282 then receives the results and returns the results to the virtual table interface 281. The virtual table interface 281 combines the results received from heterogeneous database accessing module 282 and returns this to the application. In this manner, the application can issue queries without needing to consider whether the actual table is in a heterogeneous database or distributed across a plurality of databases. Heterogeneous database accessing module 282 converts between query statements (SQL), data types (e.g., representation of dates), character codes (e.g., ASCII or EBCDIC), and the like and serves to absorb these differences.

While the virtual table interface creates virtual tables, replica creating/accessing module 283 performs replication in which real tables are created. However, replication does not necessarily combine tables distributed across a plurality of databases. In a standard replication operation, data that has been updated since the previous replication operation is extracted from the transaction data of the enterprise-system database and sent to the data warehouse database so that the data is reflected in the data warehouse database. By repeating this replication operation periodically, the contents of the transactions in the enterprise system can be accumulated in time sequence in the data warehouse database. Replica creating/accessing module 283 sets up the user definition for replication operations (what types of records are to be extracted from which database tables to be reflected in which database tables) and runs these replication operations. Instructions from refresh manager 284 are used to determine which replications are to be run when. Replication operations are performed via access to the database from which data is to be extracted, the database to which data is to be reflected, and if necessary heterogeneous database accessing module 282 to convert data types and character codes.

Refresh manager 284 manages the time interval between replications. When an application is to analyze data from tables generated by replication, this data can only contain information up to the last replication. The more recent the replication is, the newer the data is, i.e., analysis can be performed using fresher data. Standard replication intervals can be a month, a day, a few hours, and the like. Taking into account the operations to be performed by an application, the user sets up refresh manager to indicate how often refreshing is required. Refresh manager runs replication operations at an interval based on the requested refresh setting. The replication operation is executed by issuing a replication execution instruction to replica creating/accessing module 283.

In performance manager, the user defines the requested time for replication operations. The amount of data to be extracted in replication is also defined by the user. Then, the transfer bandwidth needed for transferring the data is calculated from the amount of data that needs to be processed during replication and the processing time. Configuration manager is instructed to allocate intermediate volumes and host paths, which serve as the transfer route, so that the necessary bandwidth is provided.

Figure 3:
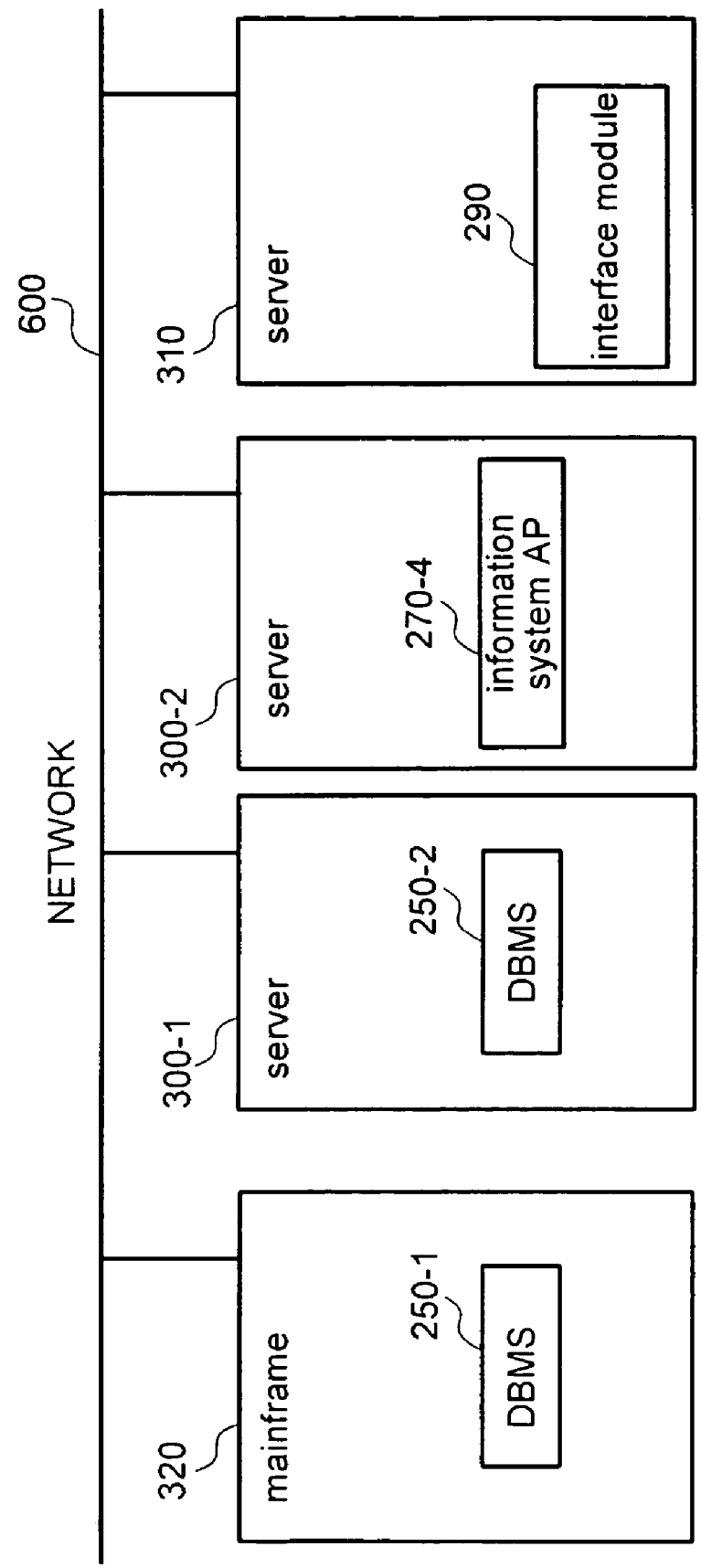
FIG. 3 illustrates a drawing showing a representative architecture of a heterogeneous DBMS access system based on an interface module in a particular embodiment according to the present invention.

FIG. 3 shows a sample architecture based on the heterogeneous DBMS access system in a particular embodiment according to the present invention. One such embodiment can employ a technique for performing extraction from heterogeneous databases described in U.S. Pat. No. 5,649,168, for example. Sections that are not directly relevant to the description are omitted from the figure. An information system application 270-4 issues a query to an interface module 290 of a server 310, and the interface module 290 converts and sends this as a query to the corresponding DBMS 250-1 and 250-2. The results are obtained via the network 600 and are passed through the network to the information system application 270-4. These functions are provided by the heterogeneous database accessing module 282 and the virtual table interface 281 of database combining module 280.

While the virtual table is literally an imaginary table, the tables generated by the replication operation described above are actual (real) tables. The virtual tables are not actually created as tables in a database. When there is a request for data from an application, it appears to the application as though the data exists in a table in a database. However, each time there is a request, the interface module is used to read via the network only the data that was requested. When creating real tables, the replication operation described above is time consuming. However, once the table is made, data analysis operations can be performed quickly. The choice of technique is determined by the trade-off between replication processing time and data analysis processing time.

The degree of refreshing required by the data affects the frequency at which replication operations are to take place, and thus affects replication processing time. The requested refresh (replication time) interval can be set up in data refresh manager 284, for example. To choose the technique to use, a comparison can be made of data analysis processing time and the time required by a single replication obtained by performance manager 285. If the data analysis processing time is shorter, virtual tables can be selected. If the replication processing time is shorter, real tables can be generated through replication. Configuration manager 286 performs configuration management such as allocation of transfer volumes.

The following is a description of measures that can be taken in this embodiment, shown in FIG. 1, if the data transfer bandwidth of the intermediate volume acts as a bottleneck in replication performance or if volume accesses for replication operations have a negative effect on enterprise system applications. Volume allocating module 201 measures data transfer speeds when volumes are in operation. The results are compared to performance data measured beforehand for the volume to determine if the volume is acting as a performance bottleneck. It would be possible to set up a threshold value to set up how much capacity of the volume should be used during replication operations. If the transfer bandwidth of the intermediate volumes is acting as a bottleneck, the number of volumes allocated as intermediate volumes can be increased.

If the volume from which data is being transferred is acting as the bottleneck, snapshot module 203 in the disk storage system 100 is used to generate a replica of the source volume. A snapshot is a replica of the data in an original database at a certain moment. Then, by using only the replica, negative influences on the enterprise system application can be eliminated. Also, if the bottleneck is the intermediate volume used in the transfer as described above, then the bottleneck can be eliminated by performing the transfer using replica volumes, including the volumes allocated earlier. If the bandwidth of the host path is the bottleneck, then a plurality of host paths can be allocated. This allocation is performed by host path allocating module 200.

Figure 4:
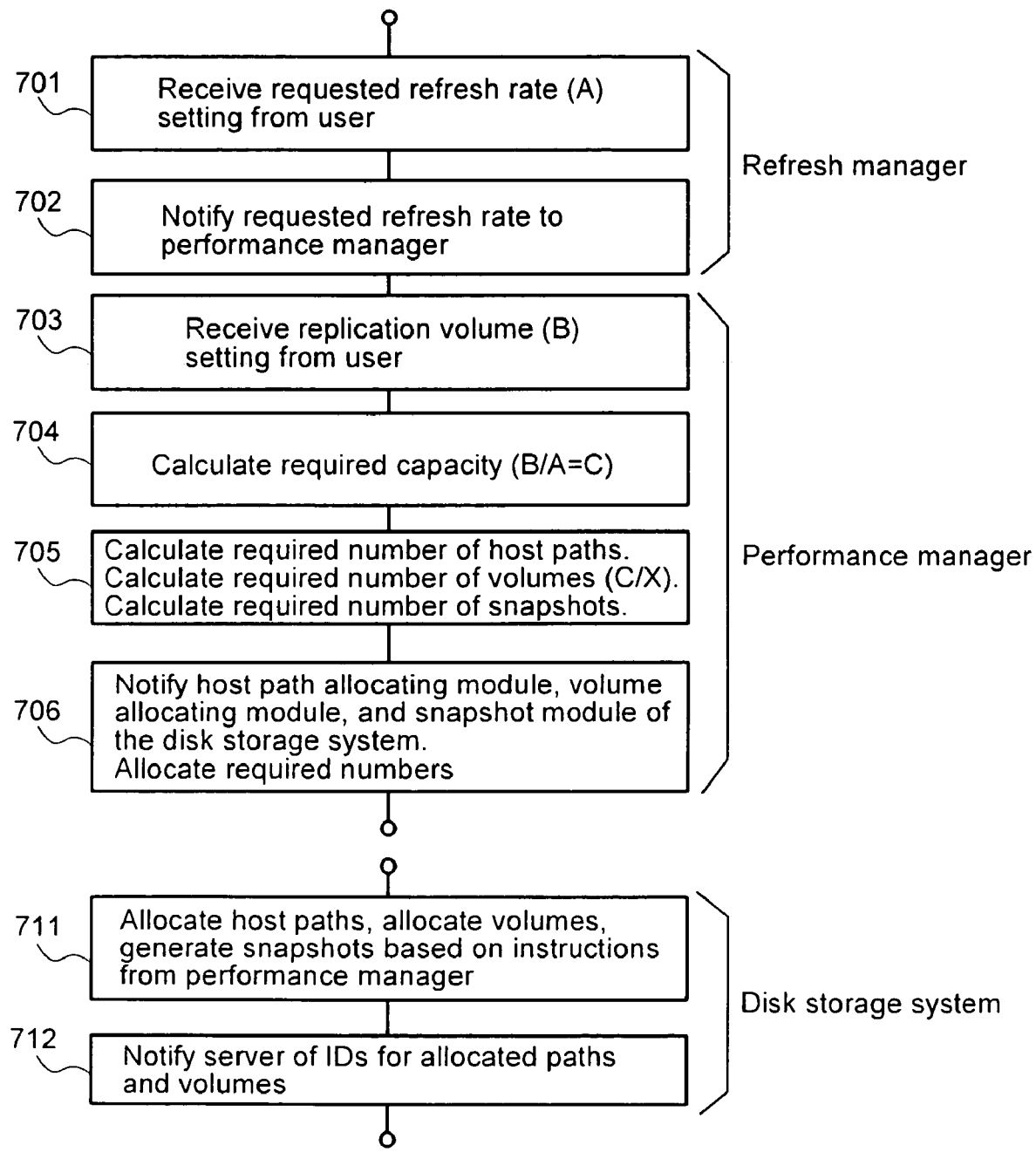
FIG. 4a illustrates a flowchart showing a representative processing for controlling replication in a particular embodiment according to the present invention.
FIG. 4b illustrates a flowchart showing a representative processing for controlling replication in a particular embodiment according to the present invention.
Figure 4:
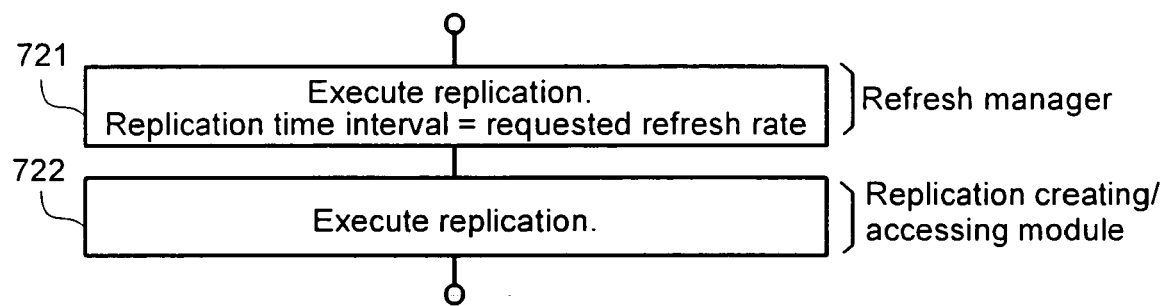

Referring to FIG. 4*a* and FIG. 4*b*, the following is a description of refresh management, performance management, and disk storage system operations when a disk storage system is used with database combining module according to the present invention. First, an overview of the operations performed by the present invention will be described. The user enters a requested data refresh setting. Next, the replication volume is set up. Then the data transfer bandwidth required for performing replications according to the user request is calculated, and snapshot generation is performed, taking into consideration issues relating to host paths, intermediate volumes, and transfer capabilities of the source. The disk storage system provides the following resources: host paths, disk volumes used as intermediate volumes, and database replicas created from the snap shot.

In FIG. 4*a*, steps 701, 702 are executed by refresh manager of database combining module. A requested refresh rate (A) setting is received from the user in a step 701. The requested refresh rate represents the frequency at which the database is updated, e.g., the database is updated once a day, once a week, or once a month. Then, in a step 702, the requested refresh rate is notified to performance manager 285. Step 703 through step 706 are executed by performance manager 285 of database combining module 280. In a step 703, a replication data volume (B) setting is received from the user. Next, in a step 704, the required transfer bandwidth (C) is calculated from this information (B/A=C). Based on this, the required amount of resources in the disk storage system is determined in a step 705. Specifically, this refers to the number of host paths required, the number of intermediate volumes required, and the number of snapshot databases of the transfer source database required. The number of required host paths is determined to eliminate host path bottlenecks, the number of required volumes is determined to eliminate data transfer bottlenecks in the intermediate volumes, and the number of required snapshots is determined to eliminate bottlenecks caused by read performance of data from the transfer source database volumes. In a step 706, these results are provided to host path allocating module 200, volume allocating module 201, and snapshot module 203, and the required number of resources are allocated.

Steps 711, 712 are executed by the disk storage system. Based on the instruction from performance manager 285, host paths are allocated, intermediate volumes are allocated, and snapshots are generated in a step 711. Then, in a step 712, the identifiers of allocated paths and volumes are notified to the server with database combining module.

Referring to FIG. 4*b*, in a step 721, refresh manager 284 runs replication operations based on intervals obtained based on the requested refresh rate, e.g., one month, one day, a few hours, as described above. Based on this, replica creating/accessing module 283 controls the disk storage system to execute replication operations in a step 722.

As described above, the high-speed operations provided by the disk storage system is used and the volumes therein are used as intermediate buffers. These are operated together with database combining module disposed in the server, thus allowing performance to be controlled to provide optimal replication.

Figure 6:
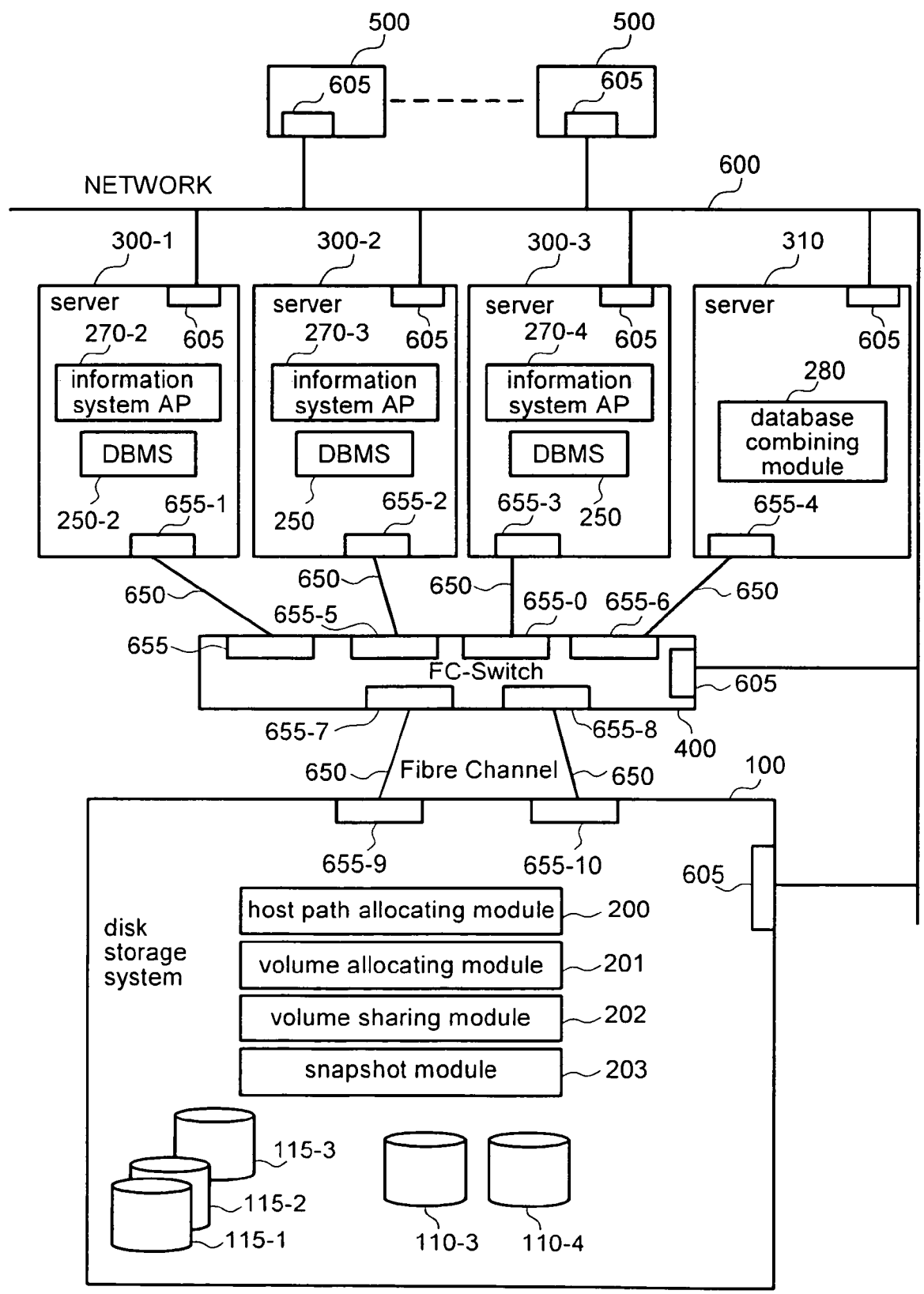
FIG. 6 illustrates a drawing showing a representative architecture for another embodiment according to the present invention.

The following is a description of a second embodiment of the present invention, with reference to FIG. 6. In FIG. 6 the enterprise system server is omitted from the drawing. In this embodiment, there are many information system servers, and replication is performed to generate a plurality of data marts simultaneously from a data warehouse database.

A server 300-1 is a server containing a data warehouse database volume 115-1. Servers 300-2, 300-3 perform analysis using information system applications 270-2, 270-3 using data mart volumes 110-3, 110-4 extracted from the data warehouse database. A server 310 contains database combining module 280.

As described at the start, current corporate information systems often accumulate history information over time from enterprise-system OLTP systems in a data warehouse database. Information system applications generate tables containing data, required to perform their respective analyses, extracted from the data warehouse database. If these information system applications have real tables, the required data must be transferred to the information system applications using replications. If a plurality of replication operations are running at the same time, the volumes of the source data warehouse database will experience a heavy load. This load is measured by volume allocating module 201 of the disk storage system 100. If the load is at or exceeds a fixed value, snapshot module 203 generates replicas (115-2, 3) of the data warehouse database volume 115-1. Database combining module 280 measures replication processing time. If the time is at or exceeds the requested specification, a query is sent to volume allocating module 201 via the network 600. If volume capacity is insufficient, a request is made to create a replica.

As was also described with the first embodiment, the performance of the host paths are monitored by host path allocating module 200. If host path performance is acting as a bottleneck, a host path experiencing low usage is allocated and the results are notified to configuration manager 286 of database combining module 280. Configuration manager 286 notifies the information system applications 270-2, 270-3, DBMS 250-2, 250-3, and the like of changes in the configuration and access paths are changed. The changes in access paths can generally be notified to the volume being accessed in the form of a combination of the allocated SCSI ID and LUN. If necessary, configuration manager 286 notifies the FC-switch 400, changes the zone settings, and grants access permission to the zone containing the new host path for the zone containing the fibre channel interface of the server that needs to access the zone.

As a result, operations can be carried out with no performance degradation even if a plurality of replications is taking place at the same time. Also, the information system applications 270-2, 270-3 can be operated without requiring awareness of the functions needed to allow flexible changes in response to changes in settings, requested specifications, or environment, e.g., performance monitoring, volume allocation, host path allocation, and FC-Switch settings.

Although the above has generally described the present invention according to specific systems, the present invention has a much broader range of applicability. In particular, while foregoing has described a specific embodiment having illustrated representative network and channel interconnection architectures, such architectures are merely illustrative of the plurality of embodiments according to the present invention that can be readily achieved using the techniques described herein. Different types of networks, channel interconnects and servers can be used without departing from the techniques provided by virtue of the present invention.

The specific embodiments described herein are intended to be merely illustrative and not limiting of the many embodiments, variations, modifications, and alternatives achievable by one of ordinary skill in the art. Further, the diagrams used herein are merely illustrations and should not limit the scope of the claims herein. One of ordinary skill in the art would recognize other variations, modifications, and alternatives. Thus, it is intended that the foregoing description be given the broadest possible construction and be limited only by the following claims.

What is claimed is:

1. A computer system with a plurality of database management systems comprising:
   a disk storage system configured to store a plurality of heterogeneous databases;
   a module configured to combine said heterogeneous databases, said module disposed in a server connected to said disk storage system; and
   a network configured to interconnect said disk storage system and said server, wherein said module, responsive to receiving user-requested specifications, controls data transfer bandwidth for reflecting update data from one of said heterogeneous databases in said disk storage system to another of said heterogeneous databases; and wherein said disk storage system performs resource allocations for said bandwidth responsive to control from said module.

2. A computer system with a plurality of database management systems comprising:
   a disk storage system configured to store a plurality of heterogeneous databases;
   a module configured to combine said heterogeneous databases, said module disposed in a server connected to said disk storage system; and
   a network configured to connect said disk storage system with said server, wherein said module, responsive to receiving user-requested specifications relating to a requested refresh rate and a replication data volume, determines a required bandwidth and resources therefor in order to satisfy said user-requested specifications, and wherein said module controls resources of said disk storage system; and wherein said disk storage system performs resource allocations for said bandwidth based on control from said module.

3. In a computer system comprising a first server and a second server, interconnected by a network to a disk storage subsystem, a method for replicating comprising:
   allocating resources to perform a copy within a disk storage subsystem, said disk storage subsystem comprising a first database and a second database different from said first database, said first database associated with a first server, said second database associated with a second server, wherein said first database is of a first format and said second database is of a second format; and
   replicating content from said first database to said second database; wherein said replicating is performed using said resources in said disk subsystem substantially independently of sending said content over said network, wherein said replicating content from said first database to said second database in said disk subsystem comprising:
      replicating said content from said first database to an intermediate database, said intermediate database disposed on a shared volume of both said first format and said second format; and
      replicating said content form said intermediate database to said second database,
   wherein said computer system further comprises a third server;
   receiving at said third server at least one of a plurality of requested specifications relating to replication;
   determining a data transfer capacity according to said specifications;
   determining at least one of a plurality of data transfer capacity settings according to said data transfer capacity;
   notifying said disk subsystem of said data transfer capacity settings; and
   allocating resources in said disk subsystem for data transfer based on said data transfer capacity settings.

4. In a computer system comprising a first server and a second server, interconnected by a network to a disk storage subsystem, a computer program product comprising:
   code for allocating resources to perform a copy within a disk storage subsystem, said disk storage subsystem comprising a first database and a second database different from said first database, said first database associated with a first server, said second database associated with a second server, wherein said first database is of a first format and said second database is of a second format;
   code for replicating content from said first database to said second database, wherein said replicating is performed using said resources in said disk subsystem independently of sending said content over said network, wherein said replicating content from said first database to said second database in said disk subsystem comprising:
      replicating said content from said first database to an intermediate database, said intermediate database disposed on a shared volume of both said first format and said second format; and
      replicating said content form said intermediate database to said second database,
   wherein said computer system further comprises a third server;
   code for receiving at said third server at least one of a plurality of requested specifications relating to replication;
   code for determining a data transfer capacity according to said specifications;
   code for determining at least one of a plurality of data transfer capacity settings according to said data transfer capacity;
   code for notifying said disk subsystem of said data transfer capacity settings;
   code for allocating resources in said disk subsystem for data transfer based on said data transfer capacity settings; and
   a computer readable storage medium for holding the code.

5. A disk storage subsystem, said disk storage subsystem operable in a computer system comprising a plurality of computers, said plurality of computers interconnected to said disk storage subsystem by at least one of a plurality of information channels, wherein said disk storage subsystem copies content from a first database to a second database different from said first database using resources in said disk subsystem independently of sending said content over said information channels; and wherein said disk storage subsystem copies said content in accordance with a resource allocation received from one of said plurality of computers, said resource allocation based upon at least one of a plurality of data transfer capacity settings determined by said one of said plurality of computers in accordance with a data transfer capacity and at least one of a plurality of received specifications.

6. A disk storage subsystem operable in a computer system comprising a first server and a second server, interconnected by a network to said disk storage subsystem, wherein said disk storage subsystem replicates content of a first database associated with said first server to a second database associated with said second server, said first database and said second database disposed in said disk storage subsystem, said first database being different from said second database, wherein said disk storage subsystem allocates resources to perform content replication within said disk storage subsystem; and said disk storage subsystem replicates content from said first database to said second database; wherein said replicating is performed independently of sending said content over said network.

7. A computer system with a plurality of database management systems comprising: a disk storage system storing a plurality of heterogeneous databases; means for combining databases disposed in a server connected to said disk storage system and a network, for receiving user-requested specifications, and for controlling data transfer bandwidth involved in reflecting update data from a database in said disk storage system to another and different database; and said disk storage system performing resource allocations for said bandwidth based on control from said database combining means.

8. A computer system with a plurality of database management systems comprising: a disk storage system storing a plurality of heterogeneous databases; means for combining databases disposed in a server connected to said disk storage system and a network, for receiving user-requested specifications relating to a requested refresh rate and a replication data volume, for determining required bandwidth and resources therefor in order to satisfy said user-requested specifications, and for controlling resources of said disk storage system; and said disk storage system performing resource allocations for said bandwidth based on control from said database combining means.

* * * * *